United States Patent [19]

Bergman

[11] Patent Number: 5,060,420
[45] Date of Patent: Oct. 29, 1991

[54] COMBINATION MARKETING AND PLANTING PACKAGE FOR PLANT BULBS

[76] Inventor: Randal E. Bergman, 6212 - 142nd Street, Surrey, British Columbia, Canada, V3W 5M3

[21] Appl. No.: 473,225

[22] Filed: Jan. 31, 1990

[30] Foreign Application Priority Data

Feb. 7, 1989 [CA] Canada ................................ 590381

[51] Int. Cl.⁵ .............................................. A01G 9/02
[52] U.S. Cl. ........................................... 47/78; 47/77
[58] Field of Search ...................... 47/74, 76, 77, 73; 206/423

[56] References Cited

U.S. PATENT DOCUMENTS

| | | | |
|---|---|---|---|
| 2,293,531 | 8/1942 | Brooks | 206/423 |
| 2,394,192 | 2/1946 | Mann . | |
| 2,902,795 | 9/1959 | Heigl et al. | 47/78 X |
| 2,945,323 | 7/1960 | Pratt | 47/77 |
| 3,415,012 | 12/1968 | Stubbmann | 47/78 |
| 3,678,620 | 7/1972 | Voges | 206/423 X |
| 3,919,163 | 11/1975 | Clendinning et al. . | |
| 4,109,442 | 8/1978 | Maasbach | 47/76 X |
| 4,646,470 | 3/1987 | Maggio | 47/76 |

OTHER PUBLICATIONS

A. M. Leonard Catalog p. 33 Spring/Summer 1990.

Primary Examiner—Richard E. Chilcot, Jr.
Assistant Examiner—Joanne C. Downs
Attorney, Agent, or Firm—Spensley, Horn, Jubas & Lubitz

[57] ABSTRACT

An apparatus and method for marketing and planting plant bulbs. The apparatus includes a bag for enclosing a plant bulb, a filament attached to the bag for lowering the bag to a preferred depth in a planting hole, and an identifier element attached to the filament for identifying the variety of the plant bulb and the color of the flowers produced by the bulb.

10 Claims, 1 Drawing Sheet

COMBINATION MARKETING AND PLANTING PACKAGE FOR PLANT BULBS

FIELD OF THE INVENTION

This invention relates to an apparatus and method for marketing plant bulbs. More particularly, this invention pertains to an apparatus and method for planting a plant bulb at a preferred depth and for labelling the identity of the plant bulb and the colour of the resultant flower.

BACKGROUND OF THE INVENTION

Currently, plant bulbs are sold in bulk, generally without packaging. The customer typically selects bulbs of the desired variety and flower colour from different bins or baskets at the nursery or other retail outlet. Often, the selected bulbs are transferred from one parcel to another prior to planting. When the bulbs are planted the customer may have lost track of the variety or flower colour of each individual bulb, unless he has laboriously labelled each selection. The present invention provides a packaging which eliminates the need for manual labelling, and which allows bulbs to be readily identified even after planting.

In most cases it is advisable to plant bulbs at a preferred depth in order to achieve optimal plant growth. The preferred depth varies, depending on the bulb variety. Currently, it is necessary for the gardener to painstakingly measure the depth of the planting hole for each variety of bulb. The present invention also overcomes this problem by providing a predetermined marking on the planting apparatus so that each bulb can easily be planted at its preferred depth.

The prior art discloses a variety of bulb planting devices and methods. Typically, such devices are adapted to facilitate recovery of the bulbs after the growing season is over. For example, U.S. Pat. No. 3,415,012 granted to A. Stubbmann on Dec. 10, 1968 discloses a bulb planting and recovery device comprising an elongated bag having a closed end and an open mouth. The Stubbmann bag is formed from limp, open netting which is inert in soil.

The present invention, by contrast, is not adapted primarily for recovery of plant bulbs and thus the bag portion may be made of biodegradable rather than inert material. Further, it is not necessary for the bag of the present invention to have an open mouth to allow for recovery of the bulb enclosed therein. The bag of the present invention is also smaller and hence cheaper to manufacture than the Stubbmann device; this is achieved by providing a filament attached to the bag to flag the above-ground location and identity of the plant bulb rather than by placing a label on the bag itself.

Other prior art gardening devices, such as those described in U.S. Pat. No. 2,394,192 granted to C. H. Mann on Feb. 5, 1946; and, U.S. Pat. No. 2,945,323 granted to H. D. Pratt on July 19, 1960, are also primarily directed to devices for locating and removing plant bulbs after the growing season. Accordingly, such devices are not composed of biodegradable material. Such devices are also overly elaborate and expensive to mass produce and market.

Accordingly, the need has arisen for a planting apparatus for planting bulbs at a preferred depth which can be simply and economically manufactured and marketed.

SUMMARY OF THE INVENTION

In accordance with the invention, there is provided an apparatus and method for planting plant bulbs in soil at a preferred soil depth. The apparatus includes a water-porous bag for enclosing a plant bulb, a filament attached to the bag of sufficient length such that the filament extends above the soil surface when the plant bulb is planted at a preferred soil depth and an identifier element attached to the filament for identifying the variety and flower colour of the plant bulb enclosed in the bag. The identifier element is connected to the filament at a point which extends above the soil surface when the bulb is planted at its preferred soil depth.

The bag is preferably composed of biodegradable material and may consist of a flexible netting having a plurality of apertures. The identifier element is preferably a non-biodegradable material, such as a plastic label.

Advantageously, the filament may be composed of a strand of flexible material such as Nylon TM or plastic. The filament may be marked at a predetermined distance from the bottom of the bag to indicate the preferred depth for planting the bulb.

The present invention also includes a method of marketing plant bulbs including the steps of providing a water-porous bag, enclosing a plant bulb of known variety and flower colour in the bag, providing a filament having one end attached to the bag, providing a label secured to the filament adjacent the other end of the filament which identifies the bulb's variety and flower colour, and offering the bag, bulb, filament and attached label for sale to consumers as a unitary package.

DETAILED DESCRIPTION OF THE PREFERRED EMBODIMENT

Figure 1:
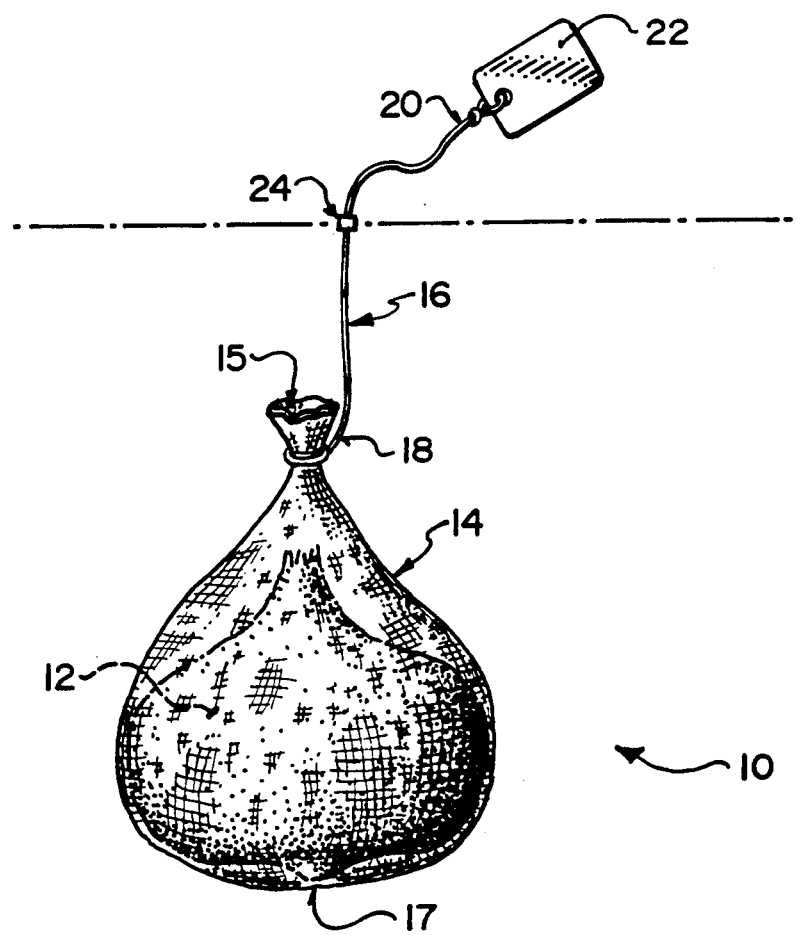
FIG. 1 is a side elevation view of a plant bulb planting apparatus constructed in accordance with the preferred embodiment of the invention.

As shown in FIG. 1, planting apparatus 10 includes bag 14 and filament 16. Bag 14 is designed to enclose a single plant bulb 12. Tulip bulbs and gladiola bulbs are typical of the plant bulbs which may be used with the present invention.

Bag 14 is composed of a suitably porous material, such as flexible stranded netting, to allow water, air, nutrients and other soil constituents to come in contact with bulb 12 after it is planted. The porosity of bag 14 also helps to prevent plant bulb 12 from rotting during storage prior to planting.

Bag 14 is also preferably biodegradable so that it does not impede the growth of bulb 12 after planting. Bag 14 may have an open mouth 15 and a closed bottom 17 to facilitate insertion of plant bulb 12 into bag 14.

Planting apparatus 10 also includes a filament 16 having a bag end 18 and a free end 20. Bag end 18 is securely attached to bag 14 in any suitable manner, such as by tying filament 16 around bag mouth 15 to close the bag around bulb 12. Filament 16 is preferably made of flexible material, such as Nylon TM or plastic twine of sufficient length such that free end 20 will extend above the soil surface when plant bulb 12 is lowered to the preferred planting depth in a planting hole.

Planting apparatus 10 further includes an "identifier means"; namely, identifier element 22 for labelling bulb 12. For example, identifier element 22 may identify the variety and the colour of the flowers that will grow from the bulb. Identifier element 22 may also provide detailed planting instructions. Identifier element 22 is intended to extend above the soil surface to provide an on-going indication of the bulb variety and flower colour after bulb 12 is planted. Accordingly, identifier element 22 is preferably made of non-biodegradable material so that the bulb variety and flower colour can be readily identified at any point during the growing season. This is of assistance if the gardener wishes to change the colour scheme or otherwise alter the overall visual effect of the garden after planting the bulbs.

In order to achieve optimal plant growth it is preferable to plant bulbs at a particular depth in the garden soil. The preferred planting depth typically varies with different species of plants. Accordingly, planting apparatus 10 includes a depth marker 24 located at a predetermined interval on filament 16 above bag bottom 17 to assist in planting plant bulb 12 at the preferred depth for the particular plant variety in question.

In operation, the gardener grasps the free end 20 of filament 16 and lowers bag 14 into a planting hole until marker 24 on filament 16 is level with the soil surface. The planting hole may then be filled with garden soil to maintain bulb 12 at its preferred planting depth.

The placement of marker 24 is predetermined to correspond with the preferred planting depth for the particular bulb contained in bag 14. Thus, it is unnecessary for the gardener to make manual measurements to ensure that the bulb is planted at the preferred depth.

Alternatively, depth marker 24 may be omitted from filament 16 of planting apparatus 10. In this alternative embodiment, the length of filament 16 will vary according to the preferred planting depth of the particular bulb 12 contained in bag 14. In operation, the bulb containing bag 14 is lowered into the planting hole until the lower end of identifier element 22 is level with the soil surface. The planting hole may then be filled with garden soil to maintain bulb 12 at its preferred planting depth. Identifier element 22 extends above the soil surface to indicate the variety and colour of bulb 12 as aforesaid.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. Apparatus for planting a plant bulb in soil at a preferred soil depth, comprising:
   (a) a water porous bag for enclosing said plant bulb;
   (b) a limp filament attached to said bag, the length of said filament being sufficient to extend above the soil when said plant bulb is plated at said preferred depth; and
   (c) identifier means for identifying said plant bulb, said identifier means being connected to said filament at a point which extends above the soil when said plant bulb is plated at said preferred depth,
   wherein said filament is marked at a predetermined distance from the bottom of said bag to indicate said preferred depth for planting said plant bulb.

2. Apparatus as defined in claim 1, wherein said bag is composed of biodegradable material.

3. Apparatus as defined in claim 2, wherein said identifier means comprises a non-biodegradable label attached to said filament.

4. Apparatus as defined in claim 1, wherein said bag comprises a flexible netting having a plurality of apertures.

5. Apparatus as defined in claim 1, wherein said filament is made of flexible material.

6. Apparatus as defined in claim 5, wherein said filament is a single strand of Nylon TM or plastic.

7. Apparatus as defined in claim 3, wherein said bag comprises a closed bottom end and an open mouth; and wherein one end of said filament is adapted to close said open mouth.

8. A method of marketing and planting plant bulbs comprising:
   (a) providing a water-porous bag;
   (b) enclosing a plant bulb of known variety and flower colour in said bag;
   (c) providing a limp filament having a marking thereon and attached at one end thereof to said bag such that the displacement between said marking and the bottom of said bag equals the preferred depth for planting said bulb;
   (d) attaching the other end of said filament to a label which identifies said bulb's variety and flower colour;
   (e) lowering said bag to said preferred planting depth in a planting hole until said marking is level with the soil surface, such that said label extends above the soil surface; and
   (f) placing soil around said bulb to maintain it at said preferred planting depth.

9. A method of marketing and planting plant bulbs comprising:
   (a) providing a water porous bag;
   (b) enclosing a plant bulb of known variety and flower colour in said bag;
   (c) providing a limp filament having a marking thereon and attached at one end thereof to said bag such that the displacement between said marking and the bottom of said bag equals the preferred depth for planting said bulb;
   (d) lowering said bag to said preferred planting depth in a planting hole until said marking is level with the soil surface; and
   (e) placing soil around said bulb to maintain said bulb at said preferred planting depth.

10. A method of marketing and planting plant bulbs comprising:
    (a) providing a water-porous bag;
    (b) enclosing a plant bulb of known variety and flower colour in said bag;
    (c) attaching one end of a limp filament to said bag;
    (d) attaching a second end of said filament to a label which identifies the bulb's variety and flower colour, such that the displacement between said filament second end and said bag bottom equals the preferred depth for planting said bulb;
    (e) lowering said bag into a planting hole to said preferred planting depth until said filament second end is level with the soil surface and said label extends above said soil surface; and
    (f) placing soil around said bulb to maintain said bulb at said preferred planting depth.

* * * * *

UNITED STATES PATENT AND TRADEMARK OFFICE
CERTIFICATE OF CORRECTION

PATENT NO. : 5,060,420

DATED : 29 October, 1991

INVENTOR(S) : Randal E. Bergman

It is certified that error appears in the above-identified patent and that said Letters Patent is hereby corrected as shown below:

In the Claims

Column 3, line 56, change "plated" to --planted--.

Column 3, line 61, change "plated" to --planted--.

Signed and Sealed this

Twentieth Day of April, 1993

*Attest:*

MICHAEL K. KIRK

*Attesting Officer*     *Acting Commissioner of Patents and Trademarks*